(12) United States Patent
Dehez et al.

(10) Patent No.: US 10,916,988 B1
(45) Date of Patent: Feb. 9, 2021

(54) ARRAY OF CONDUCTORS FOR A WINDING FOR AN ELECTRICAL MACHINE

(71) Applicant: Mirmex Motor SA, Mont-Saint-Guibert (BE)

(72) Inventors: Bruno Dehez, Mont-Saint-Guibert (BE); François Baudart, Mont-Saint-Guibert (BE)

(73) Assignee: Mirmex Motor SA, Mont-Saint-Guibert (BE)

( * ) Notice: Subject to any disclaimer, the term of this patent is extended or adjusted under 35 U.S.C. 154(b) by 0 days.

(21) Appl. No.: 16/916,519

(22) Filed: Jun. 30, 2020

(51) Int. Cl.
*H02K 3/28* (2006.01)
*H02K 3/34* (2006.01)

(52) U.S. Cl.
CPC .............. *H02K 3/28* (2013.01); *H02K 3/34* (2013.01)

(58) Field of Classification Search
CPC .................................. H02K 3/28; H02K 3/34
USPC .................................. 310/179, 180, 184, 198
See application file for complete search history.

(56) References Cited

U.S. PATENT DOCUMENTS

| 2015/0221412 A1* | 8/2015 | Caudill | ............... H01B 13/14 428/339 |
| 2018/0076678 A1* | 3/2018 | Dehez | ............... H01F 27/323 |

FOREIGN PATENT DOCUMENTS

| EP | 3297132 | 3/2018 |
| WO | 2016110549 | 7/2016 |

* cited by examiner

*Primary Examiner* — Thomas Truong
(74) *Attorney, Agent, or Firm* — Hanley, Flight and Zimmerman, LLC

(57) ABSTRACT

The disclosure relates to array of conductors for a winding for an electrical machine wherein a first group of conductors extend on a first surface parallel to a reference surface, comprising $N\_s$ subgroups each having $N\_c$ first conductors, and a second group of second conductors extend on a second surface parallel to said reference surface, comprising also $N\_s$ subgroups each having $N\_c$ second conductors. First conductors of the first group overlap second conductors of the second group at interconnection zones, comprising upper interconnection zones and lower interconnection zones opposite to the upper interconnection zones with respect to the curve, where first conductors may be connected to second conductors for forming coils. The disclosure also relates to a winding comprising such an array and to an electrical machine comprising such a winding.

18 Claims, 13 Drawing Sheets

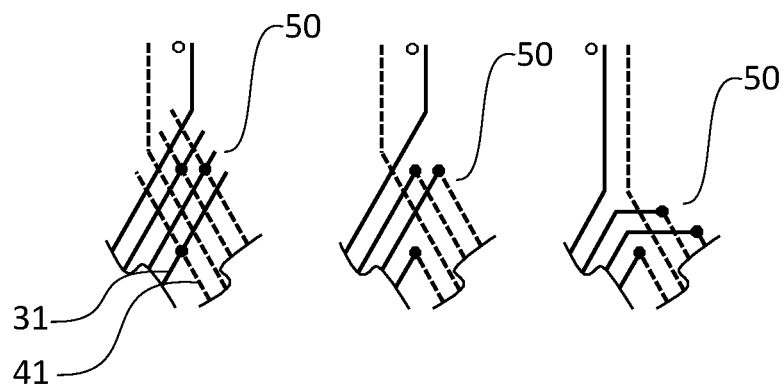
FIG. 10a  FIG. 10b  FIG. 10c
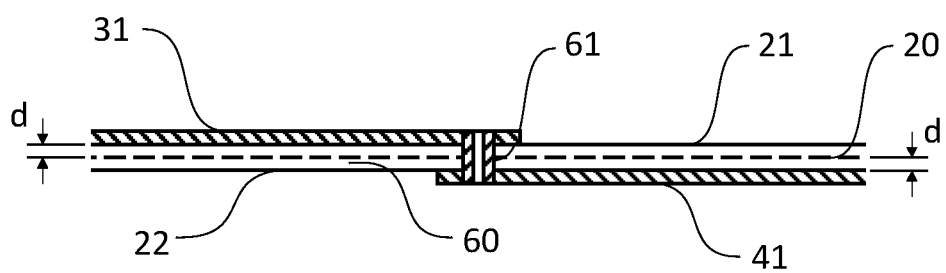
FIG. 11a
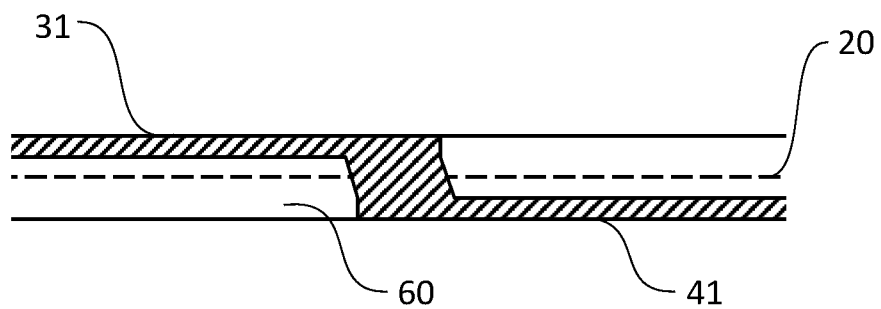
FIG. 11b
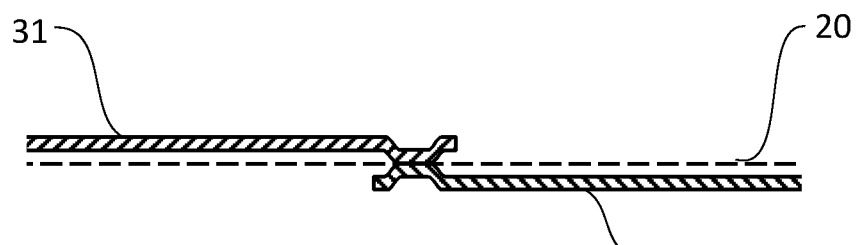
FIG. 11c

ARRAY OF CONDUCTORS FOR A WINDING FOR AN ELECTRICAL MACHINE

FIELD OF THE DISCLOSURE

The disclosure relates to array of conductors for a winding for an electrical machine, to a winding comprising such an array, and to an electrical machine comprising such a winding.

DESCRIPTION OF PRIOR ART

Document WO2016110549 a winding for an electrical machine. A plurality of conductors are connected in series so as to form one phase coil, having one current entry terminal and one current exit terminal. A plurality of phase coils may be combined for forming a multi-phase winding. However, this winding does not provide flexibility in the combination of conductors for forming phase coils having different characteristics.

Document EP3297132 discloses a winding structure for an electrical machine and a method for designing a winding structure. An object of the method is to design a winding structure for an electrical machine which leads to reduced or eliminated circulating currents when in operation in an electrical machine, i.e. to improve the equilibration of coils connected in parallel. However, no alternative combinations of conductors for forming coils are proposed. Also in the winding structure of this document the flexibility in providing different coil arrangements is very limited, There is a need for a winding for an electrical machine solving the problem of combining the conductors of the winding in coils for obtaining a desired voltage/current combination. It may be desired e.g. to design a winding with a large number of coils that can be arranged either preferably/mostly in parallel so as to reduce the amplitude of the terminal voltage, while increasing the amplitude of the line current, or preferably/mostly in series so as to increase the amplitude of the terminal voltage, while decreasing the amplitude of the line current. Furthermore, there is a need to enable windings comprising complex conductors interconnections to be manufactured easily, efficiently, and without the problems associated with traditional windings made out of compacted conductive wires.

SUMMARY OF THE DISCLOSURE

It is an object of the present disclosure to provide a structure or array of conductors for a winding for an electrical machine having an improved flexibility in the creation/ formation of multiple coils by the appropriate combinations of conductors.

The disclosure is defined by the independent claims. The dependent claims define advantageous embodiments.

According to the disclosure, there is provided an array of conductors for a winding for an electrical machine. In the following, one refers to a reference surface comprising a curve, said curve extending in a local direction t, the reference surface extending in a local direction v perpendicular to said direction t. A first group of first conductors extend on a first surface parallel to said reference surface at a distance d of said reference surface, the distance being measured in a direction u locally perpendicular to directions t and v, the first conductors extending in a direction of increasing t and v, comprising $N\_s$ subgroups each having $N\_c$ first conductors. Directions t, u and v vary according to the position on the surface or on the curve, as is customary in the differential geometry of surfaces. A distance may be provided between each first conductor of a subgroup, such that the conductors may be isolated from each other. A larger distance may be provided between each subgroup. These distances may be measured in direction t. Subgroups of the first group may be numbered from 1 to $N\_s$ increasing in the direction t. Similarly, a second group of second conductors may extend on a second surface parallel to said reference surface and at a distance −d of said surface, the distance being measured in said direction u, the second conductors extending in a direction of increasing t and decreasing v, comprising $N\_s$ subgroups each having $N\_c$ second conductors. Also, a distance may be provided between each conductor of a subgroup, such that the conductors may be isolated from each other. A larger distance may be provided between each subgroup. Also said distances may be measured in direction t. Subgroups of the second group may similarly be numbered from 1 to $N\_s$ increasing in the direction t.

The reference positive direction of the currents flowing in the first conductors of the odd numbered subgroups and of the second conductors of the even numbered subgroups is in a direction of increasing t. The reference positive direction of the currents flowing in the second conductors of the odd numbered subgroups and of the first conductors of the even numbered subgroups is in a direction of decreasing t.

First conductors of the first group may overlap second conductors of the second group at interconnection zones, comprising upper interconnection zones where subgroup i of first group may overlap subgroup i+1 of second subgroup, for all i between 1 to $N\_s-1$, and lower interconnection zones where subgroup i of second group may overlap subgroup i+1 of first group, for all i between 1 to $N\_s-1$.

An interconnection zone allows the connection of a first conductor to a second conductor overlapping said first conductor. A means for implementing such a connection when the array is implemented as a Printed Circuit Board ("PCB") is known in the art as a "via", being a hole in the PCB filled with conducting material joining electrically a first conductor on the first surface with a second conductor on the second surface overlapping the first conductor in the interconnection zone. First conductors extending in a direction of increasing t and v may comprise a single rectilinear segments, a curve, a plurality of rectilinear segments, or a plurality of curves, provided that a second extremity of a conductor is located at a position of increased t and v with respect to a first extremity of said conductor. A similar condition applies to second conductors.

The array may comprise a layer of insulating material between said first surface and said second surface.

Said layer of insulating material may advantageously be flexible. The array of conductors may be flexible. This may be obtained when the first and second conductors are sufficiently thin and the layer of insulating material is flexible.

In a first embodiment of the disclosure, the array may generally form an open path. The curve may be an open curve, and the array may comprise a left interconnection zone where the first subgroup of the first group of first conductors may overlap the first subgroup of the second group of second conductors, and a right interconnection zone where the last subgroup of the first group of first conductors overlaps the last subgroup of the second group of second conductors. First and second conductors extending from an upper interconnection zone to a lower interconnection zone are hereafter called half-loop conductors. The total number of half-loop conductors of the array, $N\_hl$, is equal to $2*(N\_s-2)*Nc$. First and second conductors extending from/to a lower or upper interconnection zone to/from a left or right interconnection zone are hereafter called quarter-loop conductors. The number of quarter-loop conductors of the array, N_ql, being equal to 4*N_c.

The disclosure also provides a winding for an electrical machine, comprising an array of conductors according to the first embodiment of the disclosure, wherein N_t coils are formed by connections of a sequence of a number of first and second conductors at interconnection zones, each coil having a number of half-loop conductors and a number of quarter-loop conductors. The total number of equivalent quarter-loop conductors N_eql of the winding is equal to 2*N_hl+N_ql. Each coil may have a first and a second terminal, for feeding to or receiving currents from the coil. According to the disclosure, the number of coils, N_t, may either be (i) a divisor of N_hl and a divisor of N_ql, or (ii) a divisor of N_hl+N_ql/2.

When condition (i) is satisfied, if N_eql/N_t is a multiple of 4*(N_s−1), meaning that the first terminal of a coil is located in the same interconnection zone as the second terminal of said coil and that the coil travels one or more times all subgroups of the first and second group of conductors, such a coil being called thereafter a "complete coil", and if N_t is equal to N_c, it is preferred that either at least one coil has its first and second terminal in a right or a left interconnection zone, or at least two coils have their first and second terminals in two different interconnection zones, meaning that in the winding, it is excluded that all coils have their first and second terminal in the same interconnection.

When condition (i) is satisfied, but when N_eql/N_t is not a multiple of 4*(N_s−1), i.e. the coils are not "complete coils", this exclusion does not apply, and the winding comprises a plurality of N coils, N being the smallest integer such that N*N_eql/N_t is a multiple of 4*(N_s−1), a first coil of said plurality of coils having a first terminal in a first interconnection zone, a last coil of said plurality of coils having a second terminal in said first interconnection zone, second terminals of coils of said plurality of coils being in same interconnection zone as a first terminal of a coil of said plurality of coils. In other words, the plurality of N coils are equivalent to a "complete coil" cut in parts of equal length i.e. of equal number of equivalent quarter-loops. The number of such pluralities is N_t/N, meaning that all available first and second conductors are used. Preferably, the direction from first terminal to second terminal of each of these coils follow the reference positive direction of the currents in the conductors.

When condition i) is not satisfied and condition ii) is satisfied, the winding comprises Nt/N pluralities of N coils, N being the smallest integer such that N*N_eql/N_t is a multiple of 4*(N_s−1), a first coil of said plurality of coils having a first terminal in a first interconnection zone, a last coil of said plurality of coils having a second terminal in said first interconnection zone, second terminals of coils of said plurality of coils being in same interconnection zone as a first terminal of a coil of said plurality of coils. In other words, the plurality of N coils are equivalent to a "complete coil" cut in parts of equal length, i.e. of equal number of equivalent quarter-loops.

The winding may be used in a cylindrical electrical machine, with radial field. The reference surface may then be a cylinder, the curve may be a circle. The electrical machine may have an inductor structure comprising a sequence of north and south magnetic poles along said curve, each magnetic pole producing a magnetic field generally in local direction u. The number of poles of the winding, N_s−1, may be equal to or lower than the number of poles of the inductor structure. As is well known in the art, for an efficient working of the electrical machine the distance between the subgroups of first and second conductors may be such that the poles pitch of the resulting winding matches the pole pitch of the inductor structure.

The winding may also be used in a cylindrical electrical machine, wherein said curve may be a spiral. The winding may be rolled up a plurality of times around an axis, along said spiral. The electrical machine may have an inductor structure comprising a sequence of north and south magnetic poles along said curve, the number of poles of the inductor being smaller or equal to that the number of poles of the winding, N_s−1, each magnetic pole producing a magnetic field generally in local direction u. As is well known in the art, for an efficient working of the electrical machine the distance between the subgroups of first and second conductors must be such that the poles pitch of the resulting winding match the pole pitch of the inductor structure. Therefore, said distance must increase progressively such that the azimuthal distance between the poles of the winding matches the azimuthal distance of the poles of the inductor structure.

The winding may also be used in a linear electrical machine, wherein said reference surface may be a plane, and said curve may be a straight line. The electrical machine may have an inductor structure comprising a sequence of north and south magnetic poles along said straight line, each magnetic pole producing a magnetic field generally in local direction u. As is well known in the art, for an efficient working of the electrical machine the distance between the subgroups of first and second conductors must be such that the pole pitch of the resulting winding match the pole pitch of the inductor structure. The number of poles of the winding, N_s−1, may be smaller than, larger than or equal to the number of poles of the inductor structure.

The winding may also be used in a cylindrical electrical machine, with an axial field. Said reference surface may then be a plane, said curve may be a circle. The electrical machine may have an inductor structure comprising a sequence of north and south magnetic poles along said curve, each magnetic pole producing a magnetic field generally in local direction u. As is well known in the art, for an efficient working of the electrical machine the distance between the subgroups of first and second conductors may be such that the pole pitch of the resulting winding match the pole pitch of the inductor structure. The number of poles of the winding, N_s−1, may be smaller than or equal to the number of poles of the inductor structure.

In a second embodiment of the disclosure, the array generally forms a closed path, meaning that the last subgroups of first and second conductors return to the first subgroups of first and second conductors Said curve may be a closed curve, and the array may comprise an additional upper interconnection zone where the last subgroup of conductors of the first group of first conductors overlaps the first subgroup of conductors of second group of second conductors, and an additional lower interconnection zone where the last subgroup of conductors of the second group of second conductors overlaps the first subgroup of conductors of the first group of first conductors. The number of subgroups, N_s, must be even. The total number of half-loop conductors of both first conductors and second conductors of the array, N_hl, is equal to 2*N_s*N_c.

The disclosure also provides a winding for an electrical machine, comprising an array of conductors according to the second embodiment of the disclosure wherein N_t coils are formed by connections of a sequence of a number N_hl/N_t of first and second conductors at upper and lower interconnection zones, each coil having a first and a second terminal, N_t being a divisor of N_hl, N_t being an even number, comprising if N_hl/N_t is a multiple of N_s, coils wherein the first and the second terminal of each coil are located in the same interconnection zone;

if N_hl/N_t is not a multiple of N_s, Nt/N pluralities of N coils, N being the smallest integer such that N*N_hl/N_t is a multiple of N_s, a first coil of each of said pluralities of coils having a first terminal in a first interconnection zone, a last coil having a second terminal in said first interconnection zone, second terminals of coils of said plurality of coils being in same interconnection zone a first terminal of a coil of said plurality of coils.

The winding may be used in a cylindrical electrical machine, with an axial field. Said reference surface may then be a plane, said curve may be a circle. The electrical machine having an inductor structure comprising a sequence of N_s/2 north and N_s/2 south magnetic poles along said curve, each magnetic pole producing a magnetic field generally in local direction u. As is well known in the art, for an efficient working of the electrical machine the distance between the subgroups of first and second conductors must be such that the pole pitch of the resulting winding matches the pole pitch of the inductor structure.

The winding may also be used in a cylindrical electrical machine, with a radial field. Said reference surface may then be a cylinder and said curve may be a circle. The electrical machine may have an inductor structure comprising a sequence of N_s/2 north and N_s/2 south magnetic poles along said curve, each magnetic pole producing a magnetic field generally in local direction u. As is well known in the art, for an efficient working of the electrical machine the distance between the subgroups of first and second conductors must be such that the pole pitch of the resulting winding match the pole pitch of the inductor structure.

The disclosure also provides an electrical machine comprising a winding according the disclosure and a plug-in interconnection module adapted to be connected to the first and second terminals of each of said N_t coils, and comprising interconnections for grouping said N_t coils in series or parallel connections and/or combinations of series and parallel connections, and terminals for accessing the resulting groups.

Preferably, said plug-in interconnection module may comprise controllable switches, and a switches controller configured for controlling the controllable switches for grouping said N_t coils in series or parallel connections In the context of the present disclosure, a divisor of an integer n, also called a factor of n, is an integer m that may be multiplied by some integer to produce n. In this case, one also says that n is a multiple of m. An integer n is divisible by another integer m if m is a divisor of n; this implies dividing n by m leaves no remainder.

SHORT DESCRIPTION OF THE DRAWINGS

These and further aspects of the disclosure will be explained in greater detail by way of example and with reference to the accompanying drawings in which:

FIG. 4b represents an equivalent electric circuit of the winding of FIG. 4a.

FIG. 7b represents an equivalent electric circuit of the winding of FIG. 7a.

FIGS. 10a, 10b, and 10c represent the connections in an interconnections zone.

FIGS. 11a, 11b and 11c are schematic cross sectional view of a winding in the area of an interconnection zone.

Figure 12A:
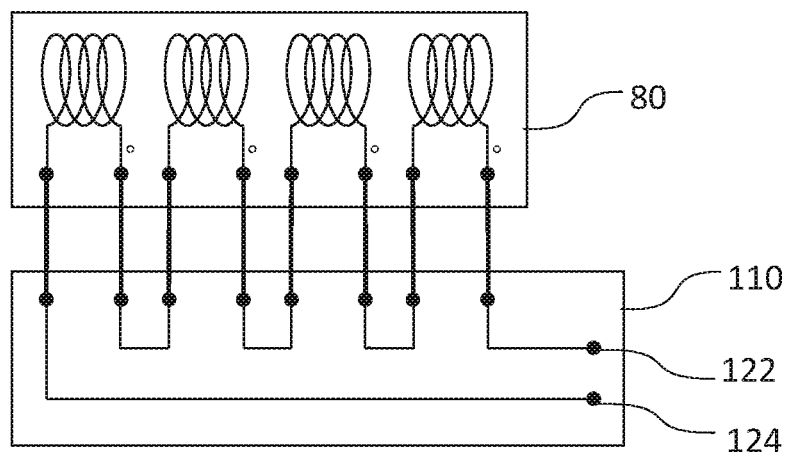
Figure 12B:
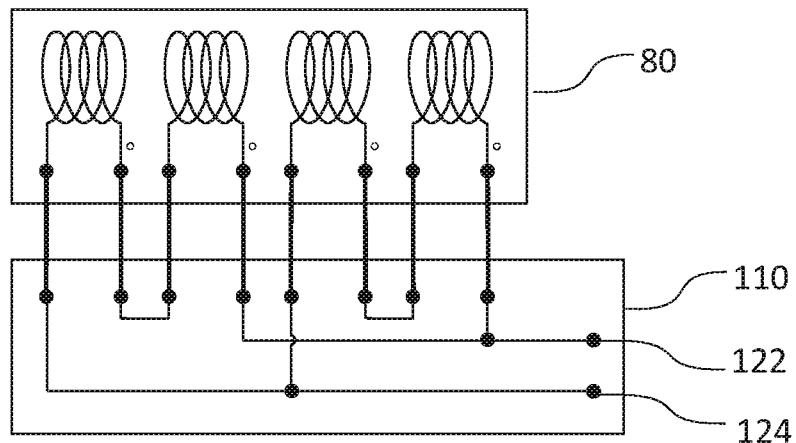

FIGS. 12a and 12b represent windings according to the disclosure, in relation with plug-in modules for obtaining different combinations of coils.

Figure 13:
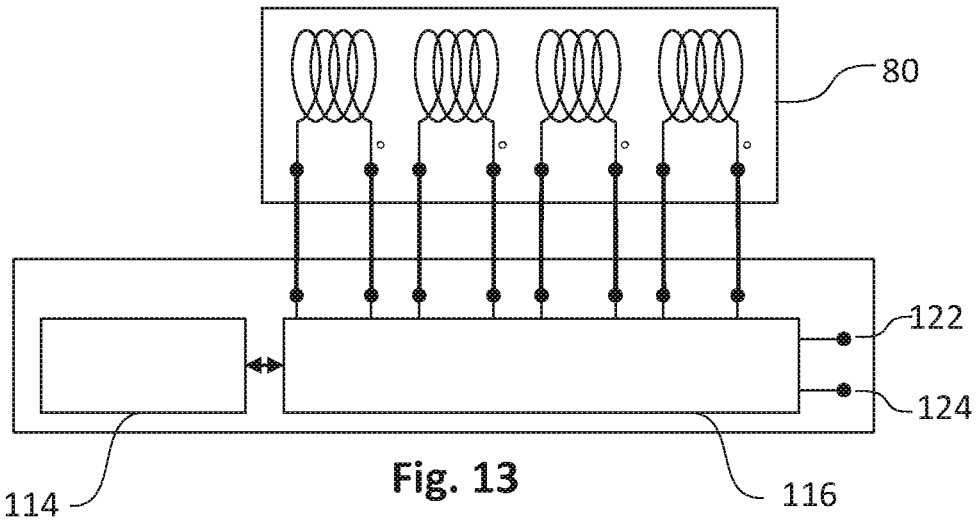

FIG. 13 represents a winding according to the disclosure, in relation with a controlling plug-in module.

The drawings of the figures are neither drawn to scale nor proportioned. Generally, identical components are denoted by the same reference numerals in the figures.

DETAILED DESCRIPTION OF EMBODIMENTS OF THE DISCLOSURE

Figure 1:
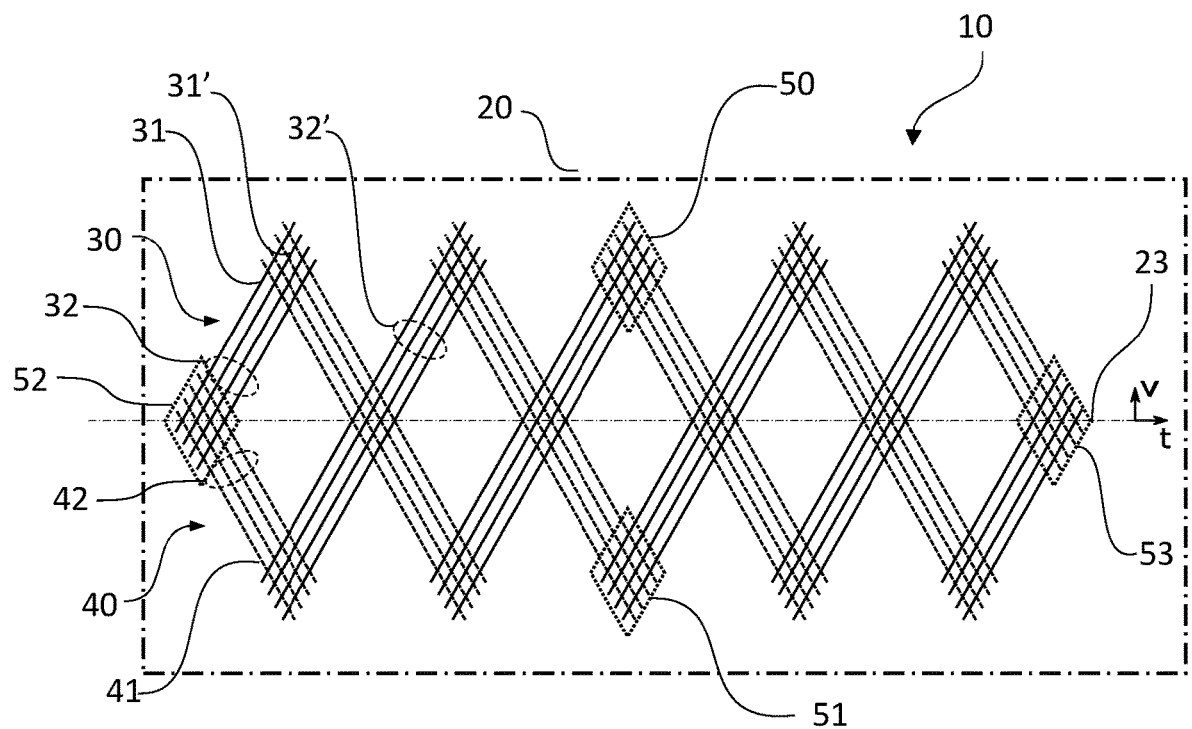
FIG. 1 represents schematically a top view of an example array according to a first embodiment of the disclosure.

FIG. 1 represents schematically a top view of an example array of conductors 10 according to a first embodiment of the disclosure. A reference surface 20 is represented as a rectangle in dot-dashed line. A curve 23 is represented as a dot-dashed line. In the example, the curve 23 is a straight line. A vector t indicates the local direction along the curve 23. A vector v, perpendicular to t, indicates the direction along which the first surface extends.

A first group 30 of first conductors 31 on a first surface are represented as continuous lines. The example represents an array 10 where six subgroups 32 (N_s=6) of first conductors 31 are part of the first group 30 of conductors. Each subgroup 32 comprises four first conductors 31 (N_c=4) and the array comprises a total of 24 first conductors 31. Successive first conductors 31, 31' of first subgroups 32 are separated by a distance such that two successive first conductors 31, 31' are electrically distinct, and such that no current may flow from one first conductor to another. Successive first subgroups 32, 32' of first conductors are separated by larger distances such that open spaces are formed between successive subgroups 32. These larger distances may be designed such that more phases of the winding may be may provided in these spaces for forming multi-phase-windings.

A second group 40 of second conductors 41 on a second surface are represented as dashed lines. Also, six subgroups 42 (N_s=6) of second conductors 41 are part of the second group 40 of conductors. Each subgroup 42 of second conductors 41 comprises four second conductors 41 (N_c=4) and the array comprises a total of 24 second conductors 41. Same conditions regarding the distances apply for the second conductors as for the first conductors.

Subgroups of first conductors 31 overlap subgroups of second conductors 41 in interconnection zones, represented as lozenges in dotted lines. In the embodiment of FIG. 1, five upper interconnection zones 50, five lower interconnection zones 51, one left interconnection zone 52, and one right interconnection zone 53 are present. Connection of a first conductor 31 to a second conductor 41 may be realized in one of the 16 (N_c² in general) overlap points. As discussed hereafter, it may be that not all these 16 overlap points are present in an interconnection zone. In the embodiment of FIG. 1, the curve 23 is an open curve and the array of conductors is qualified hereafter as an "open path" array.

Figure 2:
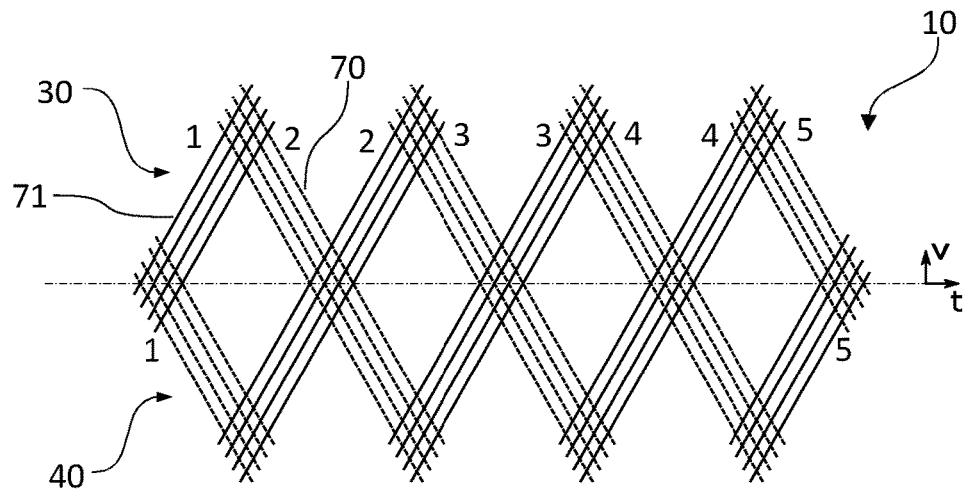
FIG. 2 represents schematically a top view of an example array according to said first embodiment of the disclosure, similar to the array of FIG. 1

FIG. 2 represents schematically a top view of another example array of conductors 10 according to same first "open path" embodiment of the disclosure similar to the array of FIG. 1, but where the number of subgroups N_s is equal to five (N_s=5).

Figure 3A:
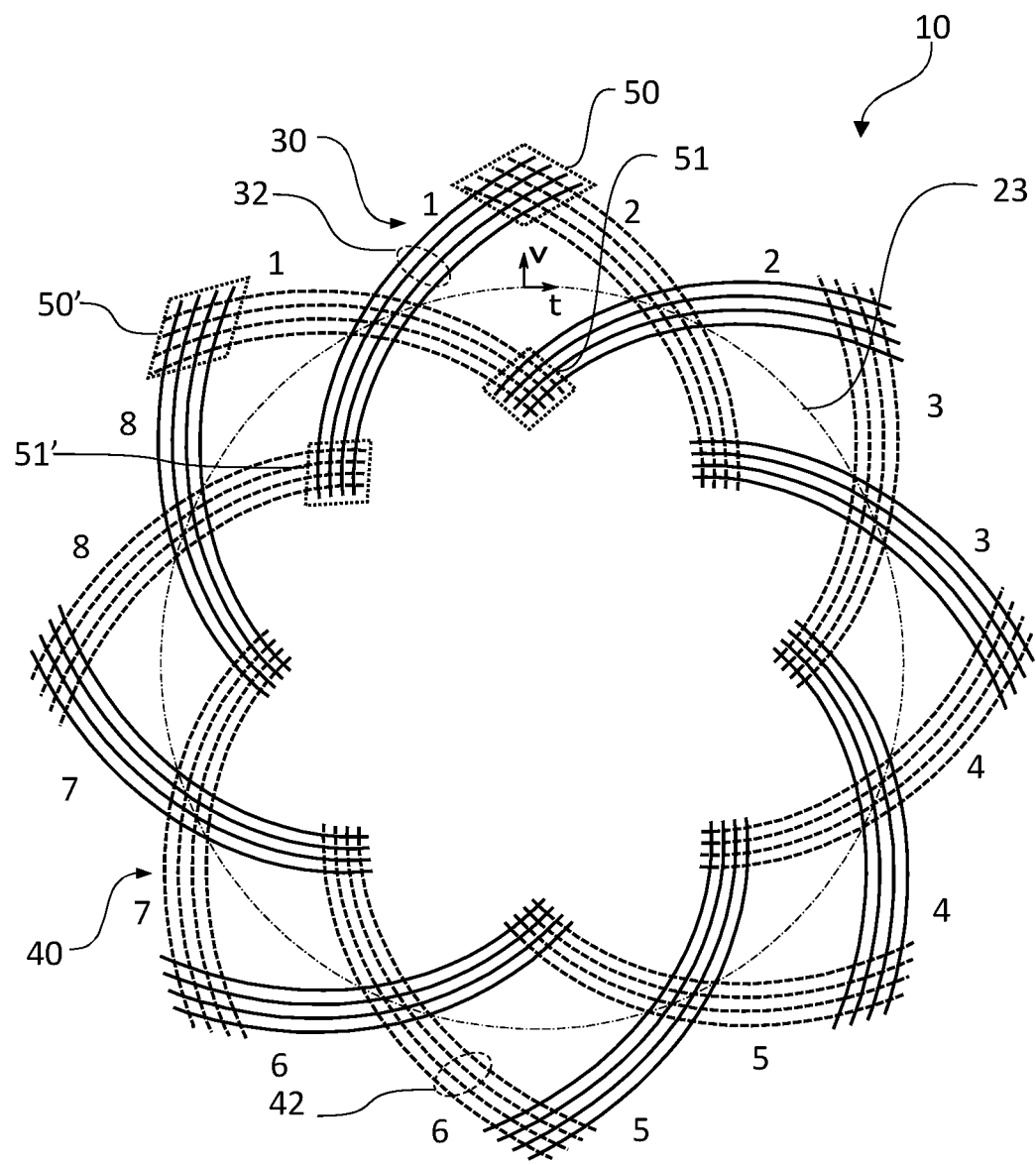
FIG. 3a represents schematically a top view of an example array according to a second embodiment of the disclosure.

FIG. 3a represents schematically a top view of another example array of conductors 10 according to a second embodiment of the disclosure, comprising an even number of subgroups. The curve 23 is here a closed curve such as a circle, as represented, having a direction t tangent to the circle, and a direction v being radial. The reference surface is a plane encompassing the circle. The array of conductors is qualified hereafter as an "closed path" array. The first group of conductors 30 comprises eight subgroups 32 (N_s=8) numbered from 1 to 8 in the clockwise direction. Similarly, the second group of conductors 40 comprises eight subgroups 42 numbered from 1 to 8 in the clockwise direction.

The first subgroup of first conductors overlaps the second subgroup of second conductors in an upper interconnection zone 50.

The first subgroup of second conductors overlaps second subgroup of first conductors in a lower interconnection zone 51.

Subsequent subgroup i of first conductors overlaps subgroup i+1 of second conductors in upper interconnection zones, for i=2 to N_s-1.

Subsequent subgroup i of second conductors overlaps subgroup i+1 of first conductors lower interconnection zones, for i=2 to N_s-1.

The last subgroup of first conductors overlaps the first subgroup of second conductors in an upper interconnection zone 50', and the last subgroup of second conductors overlaps the first subgroup of first conductors in a lower interconnection zone 51', thereby closing the path of the array of conductors. An array according to same "closed path" embodiment may also be obtained by having the closed curve 23 as a circle, and the reference surface as a cylinder enclosing the circle. When N_s is an even number, as in this example, the number of coils N_t is necessarily even, because the even subgroups of first conductors and the odd group of second conductors form a separate path from the odd subgroups of first and even subgroups of second conductors.

Figure 3B:
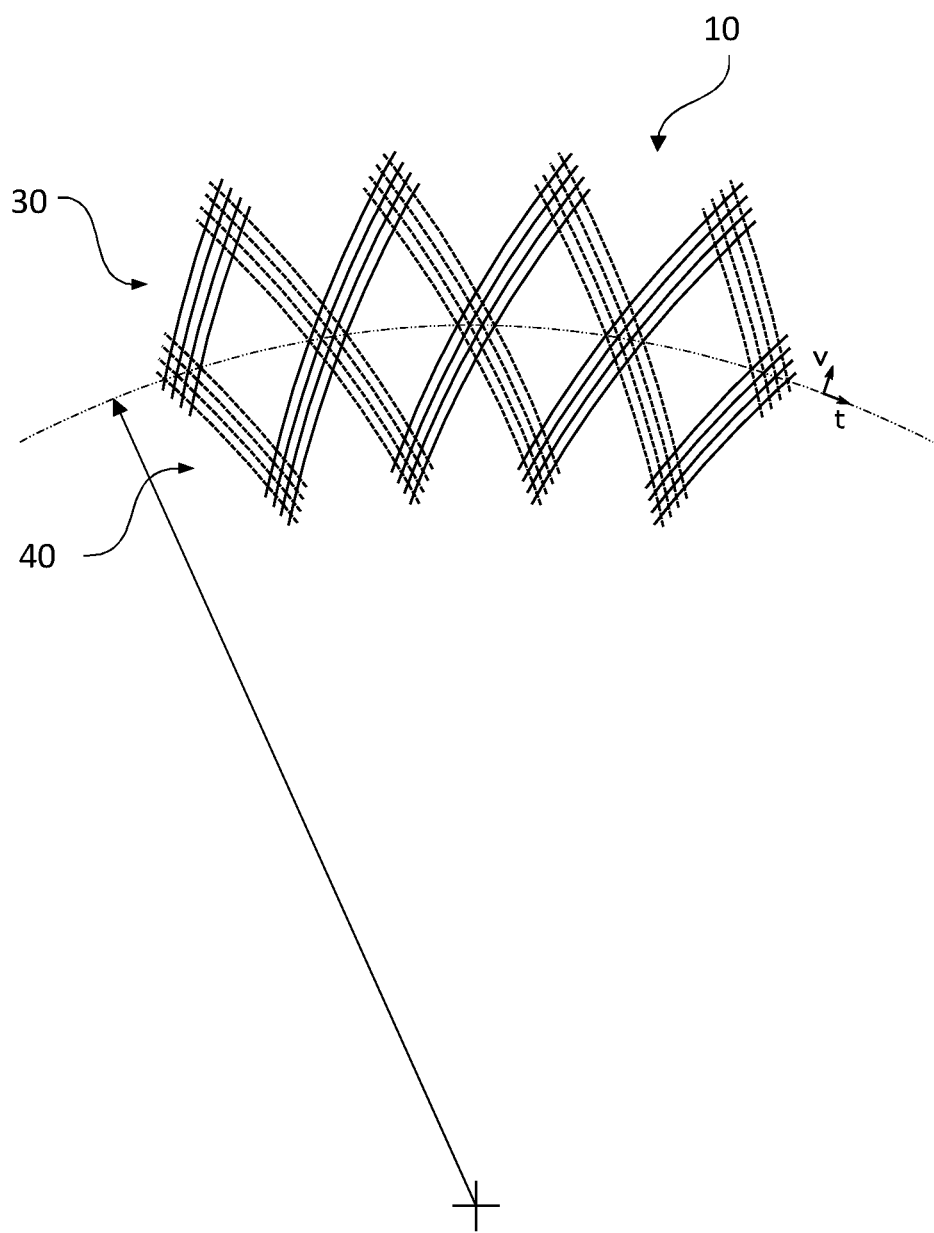
FIG. 3b represents schematically a top view of another example array according to said first embodiment of the disclosure.

FIG. 3b represents schematically a top view of another example array of conductors 10 according to said first embodiment of the disclosure. The curve 23 is here is a circle, i.e. a closed curve, having a direction t tangent to the circle, and a direction v being radial. The reference surface is a plane encompassing the circle. A winding obtained from such an array may be used in an electrical machine having an axial field. A number of such windings may be arranged around the centre of the circle for forming a complete circle, or the number of subgroups and the distances between them may be designed in order that the winding extends along the 360 degrees of the circle.

Taking the array of conductors of FIG. 2 as an example, it is now illustrated how different windings of the open-path structure may be formed. The value of N_eql in this case is 64. The array comprises a number N_ql of quarter-loop conductors 71 from a left or right interconnection zone to an upper or lower interconnection zone, the number of quarter-loop conductors 71 being 16 in the example shown (N_ql=4*N_c in general).

The array also comprises a number N_hl of half-loop conductors 70 from an upper or lower interconnection zone to a lower or upper interconnection zone, respectively the number of half-loop conductors 70 being 24 in the example shown (N_hl=2*(N_s−2)*N_c in general).

In condition i) discussed above, i.e. when N_t is a divisor of N_hl and a divisor of N_ql,
if N_hl/N_t is a multiple of N_s
N_t must be a divisor of 24 (N_hl in general), and of 16 (N_ql in general). The following values of N_t may then occur in this case, the value N_eql/N_t giving the number of equivalent quarter-loops in a coil:

| N_t | N_eql/N_t | Complete coil | N |
|---|---|---|---|
| 1 | 64 | Yes | |
| 2 | 32 | Yes | |
| 4 | 16 | Yes | |
| 8 | 8 | No | 2 |

In condition ii), discussed above, i.e. when N_t is a divisor of N_hl+N_ql/2N_t must be a divisor of 32 (N_hl+N_ql/2), and the values meeting condition i) are excluded.
The following values of N_t may occur in this case:

| N_t | N_eql/N_t | Complete coil | N |
|---|---|---|---|
| 16 | 4 | No | 4 |
| 32 | 2 | No | 8 |

In both conditions i) and ii), a number N of coils being 2, 4 and 8, for N_t=8, 16 and 32, respectively, must be made in sequence across the interconnection zones.

Figure 4A:
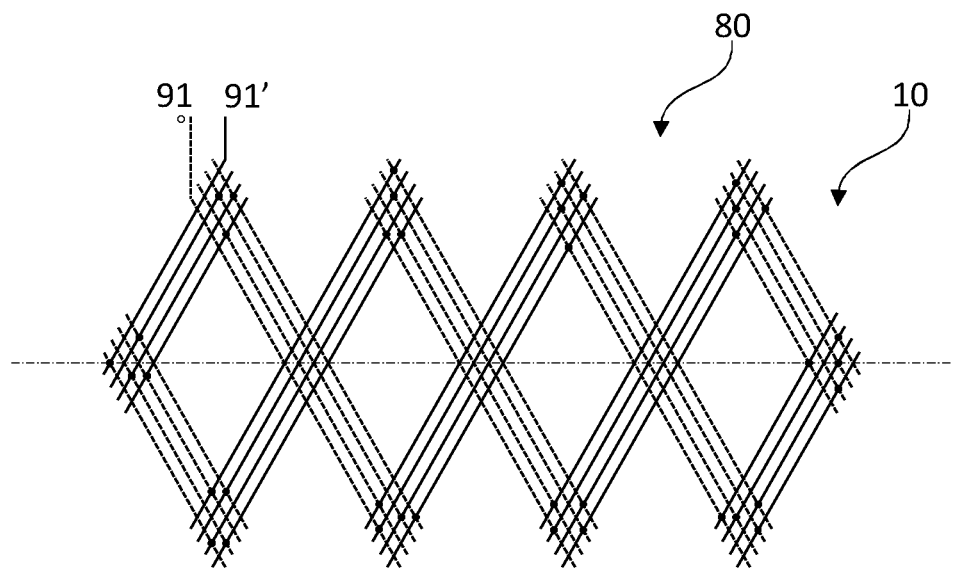
FIG. 4a represents schematically a winding obtained from the array of conductors of FIG. 2., having one complete coil.

FIG. 4a represents schematically a winding with N_t=1 obtained from the array of conductors of FIG. 2.

A single coil (N_t=1) is formed by starting from a first terminal 91 (marked with a white dot) connected to a second conductor, and proceeding from interconnection zone to subsequent interconnection zone where second and first conductors are connected at the interconnections of the interconnection zones where a black dot is marked. By proceeding like this, in the reference positive direction of the currents, defined above, selecting at each interconnection zone a free conductor, i.e. a conductor not already used in a coil, one arrives, after 64 equivalent quarter-loops, at a second terminal 91' of the coil. The resulting coil forms a four-pole winding. This coil example is a "complete coil" travelling all subgroups four times.

Figure 4B:
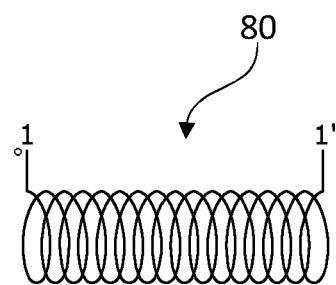

An equivalent electric circuit is shown in FIG. 4b. A multi-phase winding may be obtained by shifting a plurality of such coils in the "t" direction.

FIGS. 5a-5d represents schematically four different example windings with N_t=2 obtained from the array of conductors of FIG. 2. In each example, the two coils are "complete coils" travelling all subgroups two times and form a four-pole winding. White dots mark the first terminals of each coil. Black dots mark the interconnections of first and second conductors at the interconnection zones.

Figure 5A:
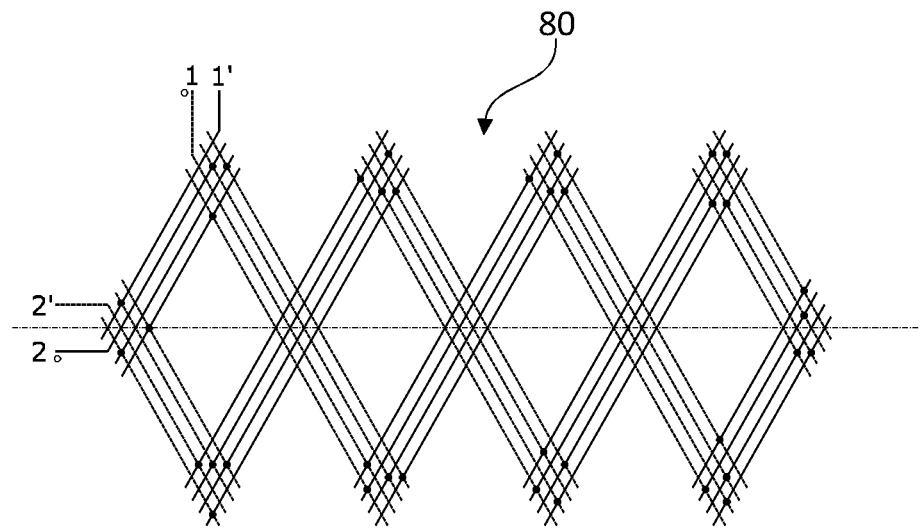
FIGS. 5a-5d represent schematically four windings obtained from the array of conductors of FIG. 2, having two complete coils.
Figure 5B:
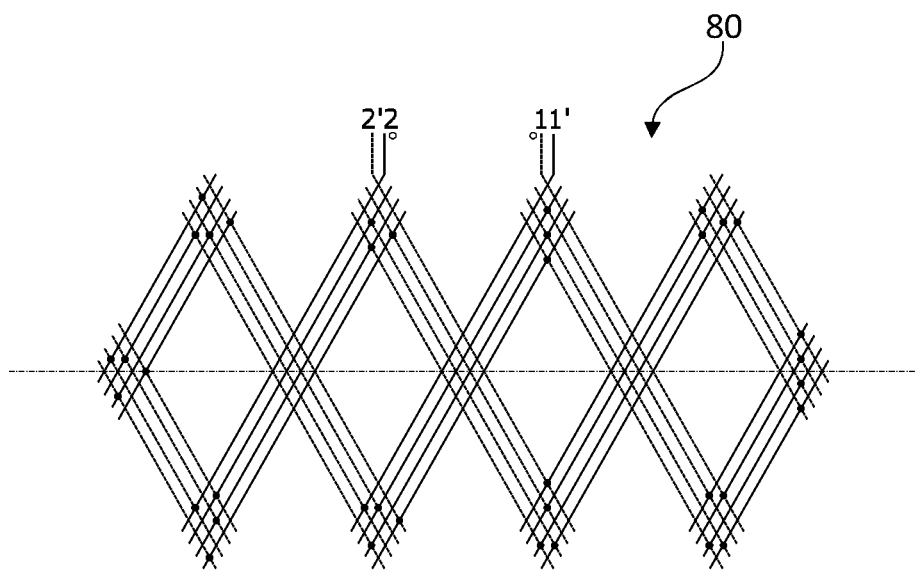
Figure 5C:
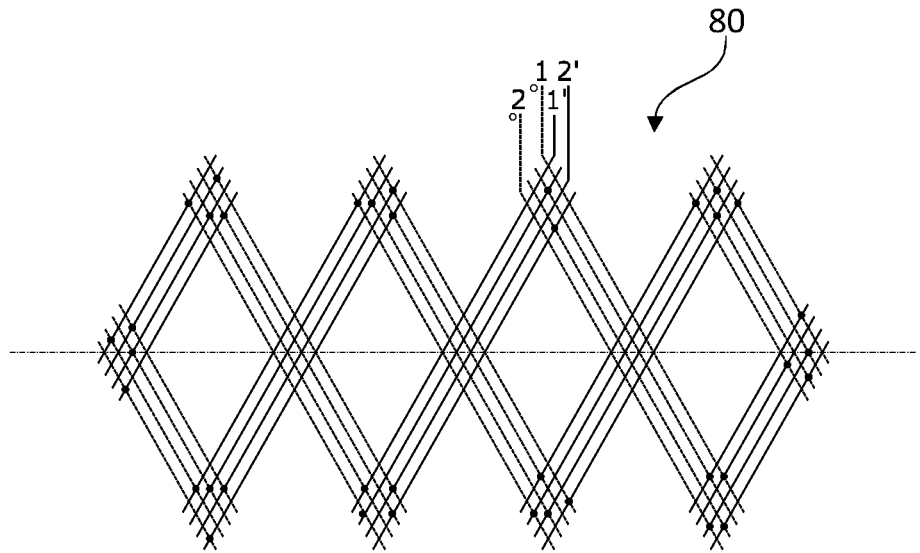
Figure 5D:
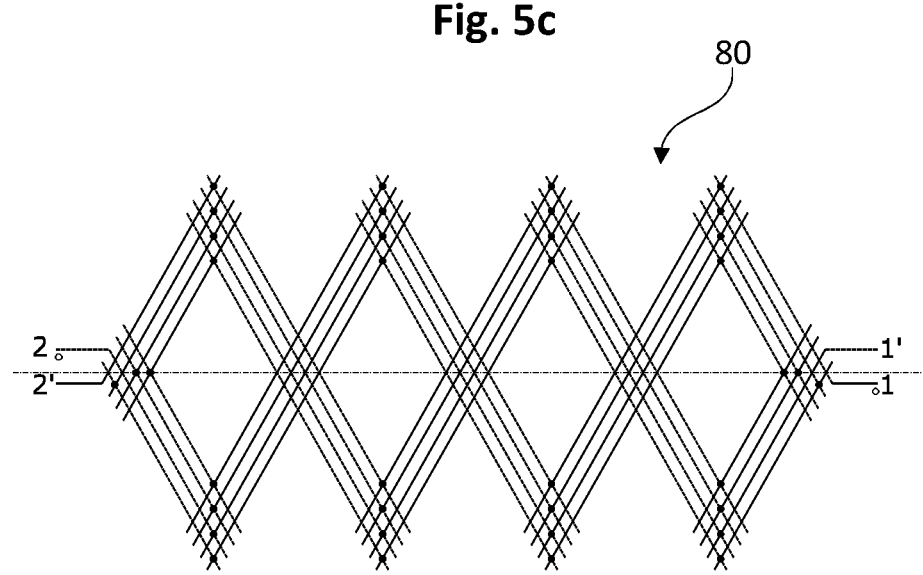
Figure 5E:
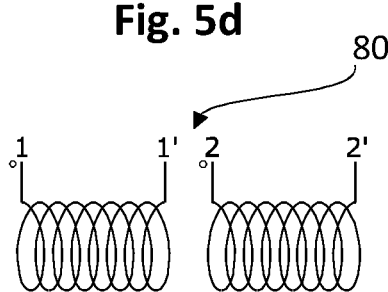
FIG. 5e represents an equivalent electric circuit of the windings of FIG. 5a-5d.

An equivalent electric circuit of the winding 80 is shown in FIG. 5e.

Figure 6A:
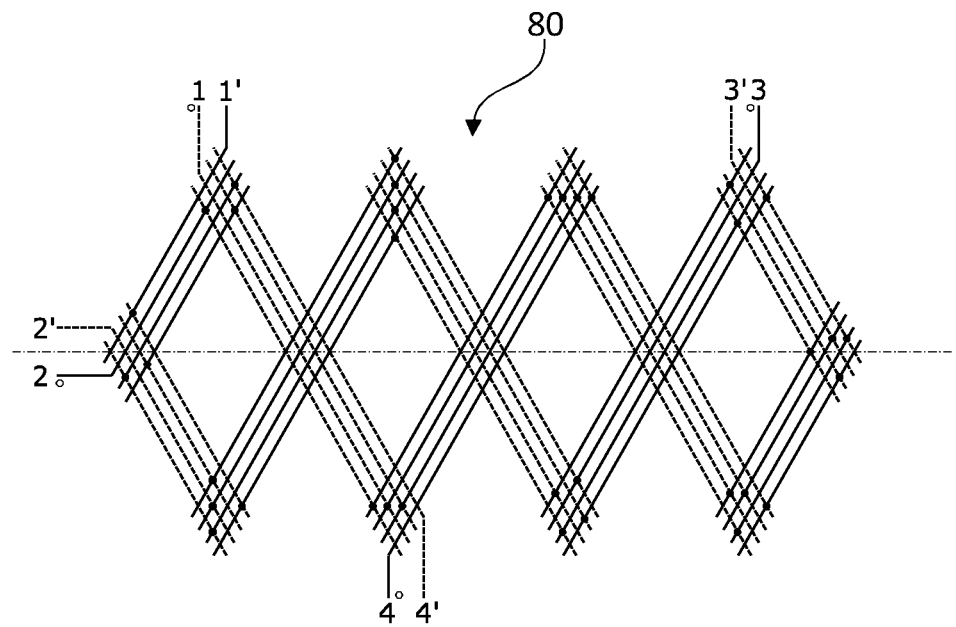
FIGS. 6a-6c represent schematically three other windings obtained from the array of conductors of FIG. 2, having four complete coils.
Figure 6B:
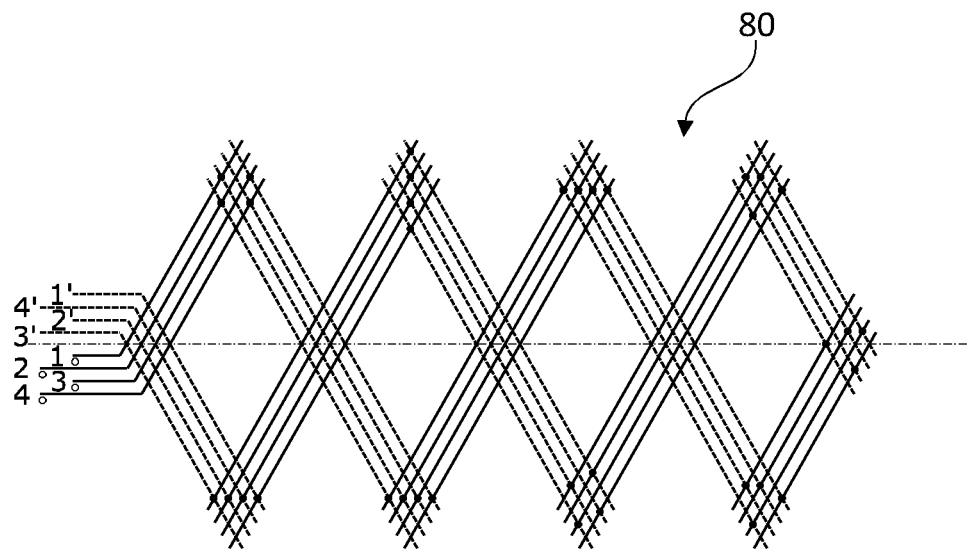
Figure 6C:
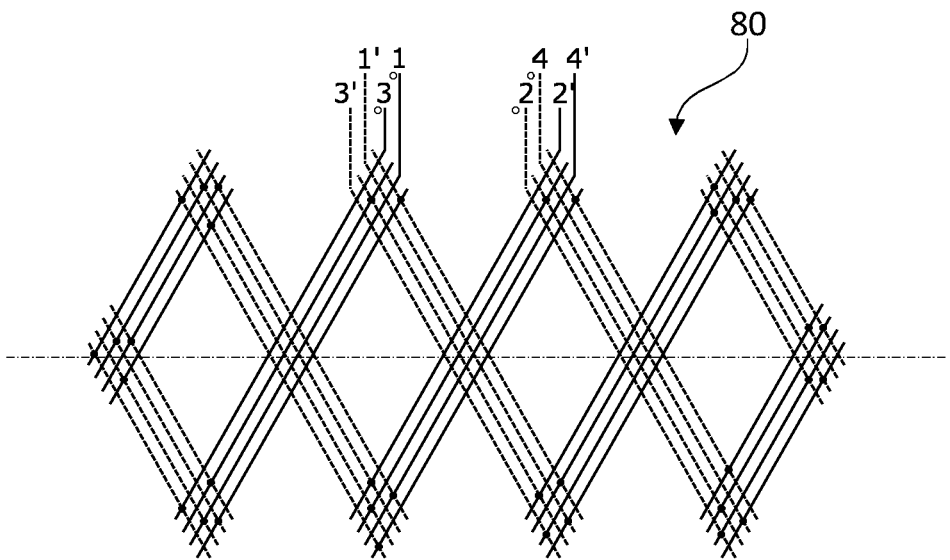
Figure 6D:
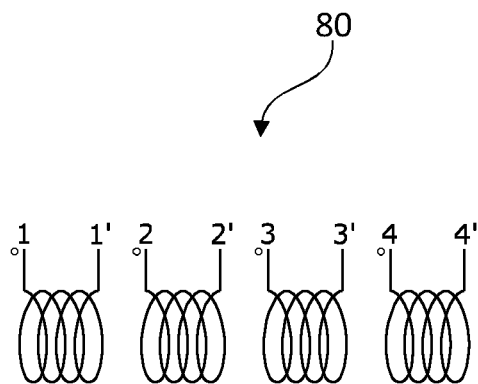
FIG. 6d represents an equivalent electric circuit of the windings of FIG. 6a-6c.

FIGS. 6a-6c represent schematically three different examples windings with N_t=4 obtained from the array of conductors of FIG. 2. In each example, the four coils are "complete coils" travelling all subgroups one time and form a four-pole winding. White dots mark the first terminals of each coil. Black dots mark the interconnections of first and second conductors at the interconnection zones. An equivalent electric circuit of the winding 80 is shown in FIG. 6d.

Figure 7A:
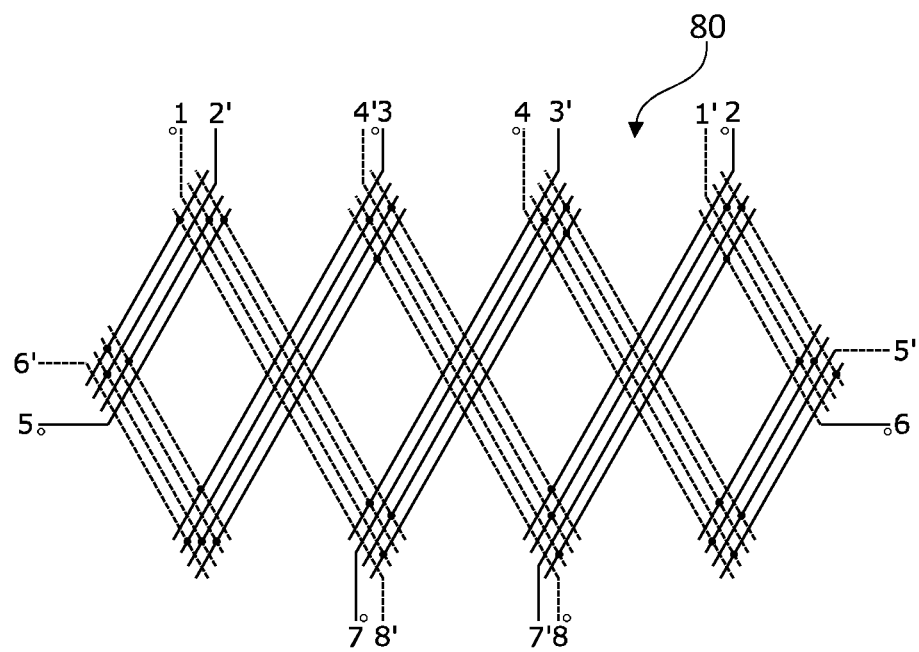
FIG. 7a represent schematically another example of winding obtained from the array of conductors of FIG. 2., where eight coils are "incomplete coils".

FIG. 7a represent schematically a windings with N_t=8, i.e. eight individual coils are formed from the array of conductors of FIG. 2. These coils are incomplete coils because, the number of equivalent quarter-loops being 64, the number of equivalent quarter-loops per coil (N_eql/N_t) is equal to 8, and is nota multiple of 4*(N_s−1) i.e. of 16. A first coil starts from an interconnection zone with terminal 1, proceeds with three half-loop conductors and two quarter-loop conductors and ends at another interconnection zone with terminal 1'. A second coil starts from said other interconnection zone, with terminal 2, proceeds with two quarter-loop conductors and three half-loop conductors up to terminal 2' located in same interconnection zone. First and second coils form a plurality of N=2 coils. Same applies for coils 3,4, coils 5,6, and coils 7,8. An equivalent electric circuit is shown in FIG. 6d.

Taking the array of conductors of FIG. 3 as an example, it is now illustrated how different windings of the closed-path structure may be formed, when N_s is an even number. The value of N_hl in this case is 64.

The array comprises a number N_hl of half-loop conductors from an upper or lower interconnection zone to a lower or upper interconnection zone, respectively, the number of half-loop conductors being 64 in the example shown (N_hl=2*N_s*N_c in general). The number of coils N_t must be an even divisor of 64 (N_hl in general). The following values of N_t may then occur in this case, the value N_hl/N_t giving the number of half-loops in a coil:

| N_t | N_hl/N_t | Complete coil | N |
|-----|----------|---------------|---|
| 2   | 32       | Yes           |   |
| 4   | 16       | Yes           |   |
| 8   | 8        | Yes           |   |
| 16  | 4        | No            | 2 |
| 32  | 2        | No            | 4 |
| 64  | 1        | No            | 8 |

Condition i), i.e. N_hl/N_t being a multiple of N_s, is satisfied for N_t=2, 4, and 8. In that case, coils have their first and second terminal in the same interconnection zone, either an upper or a lower interconnection zone. If N_hl/N_t is not a multiple of N_s, i.e for the values N_t=16, 32 and 64, a number N of coils being 2, 4 and 8, respectively, must be made in sequence across the interconnection zones.

Figure 7B:
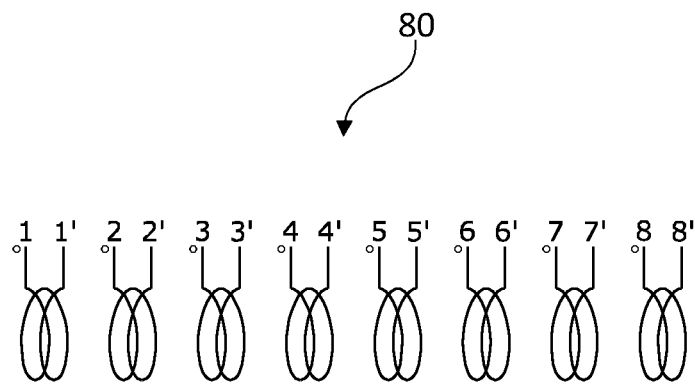
Figure 8:
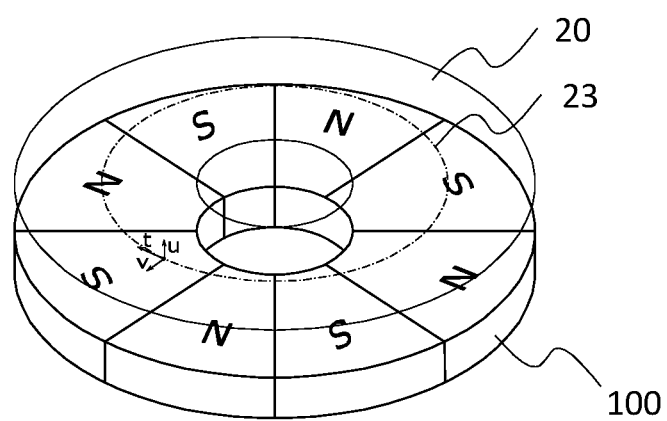
FIG. 8 is a perspective view of a winding made from an array of FIG. 3, in an electrical machine.

FIG. 8 is a perspective view of how a winding made from an array of FIG. 3a, in the closed-path embodiment, or FIG. 3b, in the open path embodiment, may be used in relation with and inductor 100, having four north and four south magnetic poles producing each a magnetic field generally oriented perpendicularly to reference surface 20. The magnetic poles are provided along curve 23. For clarity, the winding is not depicted on FIG. 7.

Figure 9:
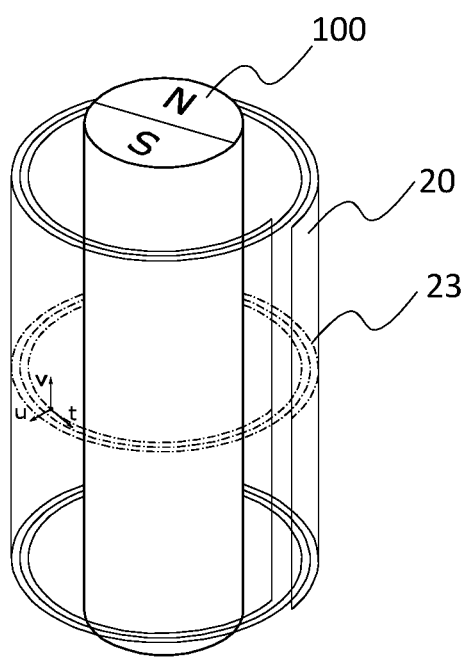
FIG. 9 is a perspective view of a winding made from an array of FIG. 1 or 2, in an electrical machine.

FIG. 9 is a perspective view of how a winding made from an array of FIG. 1 or 2, in the open-path embodiment, may be used in relation with and inductor 100, having one north and one south magnetic poles producing each a magnetic field generally oriented in a radial direction. The winding is wound up one or more times around the curve 23. The distances between poles of the winding is such that in each successive layer, the azimuthal distances of the poles match each other and the poles of the inductor.

FIGS. 10a, 10b, and 10c depict how the connections in an interconnections zone 50 between first 31 and second 41 conductors may be implemented. FIG. 10a shows a basic implementation where each first conductor is connected to a second conductor by a connection represented by a black dot. In FIG. 10b, the parts of the conductors beyond the connection points are absent, which provides a reduction in weight and cost of the winding. In FIG. 10c, the conductors are further shortened in the interconnection zone, by providing horizontal shortcuts so as to reduce the electrical resistance of the winding without impacting its magnetic coupling with the inductor.

FIGS. 11a, 11b and 11c are schematic cross sectional view of a winding in the area of an interconnection zone in different embodiments of the interconnection between first 31 and second 41 conductors.

In the embodiment of FIG. 11a a first conductor 31 on the first surface 21 of the layer of insulating material 60 is connected to a second conductor 41 on the second surface 22 of the layer of insulating material 60. The via 61 is a hole traversing the layer of insulating material wherein conductive material joins the first 31 and the second 41 conductors. The conductive material may be a rivet, a deposited electrically conductive material, a welded joint. The reference surface 20 is represented by a dotted line. The first 21 and second 22 surface are at a distance "d" from the reference surface 20.

In the embodiment of FIG. 11b, the first 31 and second 41 conductors are obtained by 3d-printing, and interconnected through an interconnection portion 62, 3d-printed together with the conductors. The intermediate layer 60 may be air and may remain open or may be filled at a later stage with a resin or other liquid to be cured or remain liquid. The insulating material may be selected for performing a thermal dissipation function.

In the embodiment of FIG. 11c, the first 31 and second 41 conductors are strips of conductive material and stamped in the interconnection zone for forming a connection 63.

The windings obtained from arrays of conductors of the disclosure provide a flexibility in the design, e.g. the individual coils formed may be connected in series or in parallel, or in a combination of series and parallel groupings, according to the needs of the application. The grouping of coils may be implemented on the array of conductors itself, by adding connections in an interconnection zone, or by providing connections between distinct interconnection zones. The description provides examples of geometry of the winding, such as cylindrical with radial flux, circular with axial flux, linear. However, many other geometries may be designed for the array and windings of the disclosure, provided the first 21 and second 22 surfaces and the curve 23 are such that the winding may interact with an inductor.

As represented on FIG. 12a and FIG. 12b, the grouping may also be made by using plug-in interconnection modules 110 distinct from the winding 80. This offers the possibility to use a single design of the winding, combined with different plug-in interconnection modules 110 depending on the application. In the example of FIG. 12a, the plug-in interconnection module 110 forms a series connection of the four individual coils of the winding. In the example of FIG. 12b, the plug-in interconnection module 110 forms two groups of coils in parallel, having each two coils connected in series. The groupings of coils include terminals 122, 124 for accessing the groupings of coils.

Also, as represented on FIG. 13, the grouping may be controlled dynamically by a controlling plug-in module 113, comprising a switches controller 114 and controllable switches 116 allowing to change the winding structure in real-time in dependence on the required torque, or changing the connections during the starting phase of an electrical machine.

The drawings representing windings according to the disclosure depict a single phase. The skilled person knows how to combine a plurality of phases shifted in the "t" direction, for obtaining multi-phase windings. When the conductors have been represented as straight lines extending in a direction, the conductors may also comprise a plurality of rectilinear segments extending generally in said direction or have a curved shape.

The invention claimed is:

1. Array of conductors for a winding for an electrical machine, the array comprising:
   a first group of first conductors extending on a first surface parallel to a reference surface at a distance d of said reference surface, the reference surface including a curve extending in a local direction t and in a local direction v perpendicular to said direction t, the distance d being measured in a direction u locally perpendicular to directions t and v, the first conductors extending in a direction of increasing t and v, comprising $N\_s$ subgroups of first conductors each having $N\_c$ first conductors, a distance being provided between each conductor of a subgroup, a larger distance being provided between each subgroup of first conductors, said distances being measured in direction t, subgroups of the first group being numbered from 1 to $N\_s$ increasing in the direction t; and
   a second group of second conductors extending on a second surface parallel to said reference surface and at a distance −d of said surface, the distance −d being measured in said direction u, the second conductors extending in a direction of increasing t and decreasing v, comprising $N\_s$ subgroups of second conductors each having $N\_c$ second conductors, a distance being provided between each conductor of a subgroup, a larger distance being provided between each subgroup, said distances being measured in direction t, subgroups of the second group being numbered from 1 to $N\_s$ increasing in the direction t,
   first conductors of the first group overlapping second conductors of the second group at interconnection zones, the interconnection zones comprising:
      upper interconnection zones where subgroup i of first group overlaps subgroup i+1 of second group, for all i between 1 to $N\_s-1$;
      lower interconnection zones where subgroup i of second group overlaps subgroup i+1 of first group, for all i between 1 to $N\_s-1$, an interconnection zone to connect a first conductor to a second conductor overlapping said first conductor;
      a left interconnection zone where the first subgroup of the first group of first conductors overlaps the first subgroup of the second group of second conductors; and
      a right interconnection zone where the last subgroup of the first group of first conductors overlaps the last subgroup of the second group of second conductors,
      first and second conductors extending from an upper interconnection zone to a lower interconnection zone being half-loop conductors, the number of half-loop conductors of the array, $N\_hl$, being equal to $2*(N\_s-2)*Nc$,
      first and second conductors extending from a lower or upper interconnection zone to a left or right interconnection zone being quarter-loop conductors, the number of quarter-loop conductors of the array, $N\_ql$, being equal to $4*N\_c$.

2. Array of conductors according to claim 1, further comprising a layer of insulating material between said first surface and said second surface.

3. Array of conductors according to claim 2, characterised in that said layer of insulating material is flexible.

4. Winding for an electrical machine, comprising an array of conductors according to claim 1, wherein $N\_t$ coils are formed by connections of a sequence of a number of first and second conductors at interconnection zones, each coil having a number of half-loop conductors and a number of quarter-loop conductors, the number of equivalent quarter-loop conductors $N\_eql$ of the winding being equal to $2*N\_hl+N\_ql$, each coil having a first and a second terminal, $N\_t$ being either
   i) a divisor of $N\_hl$ and a divisor of $N\_ql$, or
   ii) a divisor of $N\_hl+N\_ql/2$,
   and wherein when condition i) is satisfied,
      If $N\_eql/N\_t$ is a multiple of $4*(N\_s-1)$ and $N\_t$ is equal to $N\_c$, $N\_t$ coils are formed,
      If $N\_eql/N\_t$ is not a multiple of $4*(N\_s-1)$, a plurality of N coils are formed, N being the smallest integer such that $N*N\_eql/N\_t$ is a multiple of $4*(N\_s-1)$, a first coil of said plurality of coils having a first terminal in a first interconnection zone, a last coil of said plurality of coils having a second terminal in said first interconnection zone, second terminals of coils of said plurality of coils being in same interconnection zone as a first terminal of a coil of said plurality of coils,
   and when condition i) is not satisfied and condition ii) is satisfied,
      $N\_t/N$ pluralities of N coils are formed, N being the smallest integer such that $N*N\_eql/N\_t$ is a multiple of $4*(N\_s-1)$, a first coil of a plurality of coils having a first terminal in a first interconnection zone, a last coil of said plurality of coils having a second terminal in said first interconnection zone, second terminals of coils of said plurality of coils being in same interconnection zone as a first terminal of a coil of said plurality of coils.

5. Winding according to claim 4, wherein said reference surface is a cylinder, said curve is a circle, adapted for use in an electrical machine having an inductor structure comprising a sequence of north and south magnetic poles along said curve, each magnetic pole producing a magnetic field generally in local direction u.

6. Winding according to claim 4, wherein, said curve is a spiral, adapted for use in an electrical machine having an inductor structure comprising a sequence of north and south magnetic poles along said curve, the number of poles of the inductor being smaller than or equal to the number of poles of the winding, $N\_s-1$, each magnetic pole producing a magnetic field generally in local direction u.

7. Winding according to claim 4, wherein said reference surface is a plane, said curve is a straight line, adapted for use in an electrical machine having an inductor structure comprising a sequence of north and south magnetic poles along said straight line, each magnetic pole producing a magnetic field generally in local direction u.

8. Winding according to claim 4, wherein said reference surface is a cylinder, said curve is a circle, adapted for use in an electrical machine having an inductor structure comprising a sequence of north poles and south magnetic poles along said curve, each magnetic pole producing a magnetic field generally in local direction u.

9. Electrical machine comprising an array of conductors according to claim 1, wherein $N\_t$ coils are formed by connections of a sequence of a number of first and second conductors at interconnection zones, each coil having a first and a second terminal, comprising a plug-in interconnection module adapted to be connected to the first and second terminals of each of said $N\_t$ coils, and comprising interconnections for grouping said $N\_t$ coils in series or parallel connections and/or combinations of series and parallel connections, forming groupings of coils and terminals for accessing said groupings of coils.

10. Electrical machine according to claim 9, characterized in that said plug-in interconnection module comprises:
   one or more controllable switches; and
   a switches controller configured for controlling the controllable switches for grouping said $N\_t$ coils in series or parallel connections.

11. Array of conductors for a winding for an electrical machine, the array comprising:
   a first group of first conductors extending on a first surface parallel to a reference surface at a distance d of said reference surface, the reference surface including a curve extending in a local direction t and in a local direction v perpendicular to said direction t, the distance d being measured in a direction u locally perpendicular to directions t and v, the first conductors extending in a direction of increasing t and v, comprising $N\_s$ subgroups of first conductors each having $N\_c$ first conductors, a distance being provided between each conductor of a subgroup, a larger distance being provided between each subgroup of first conductors, said distances being measured in direction t, subgroups of the first group being numbered from 1 to $N\_s$ increasing in the direction t, wherein said curve is a closed curve and $N\_s$ is an even number; and
   a second group of second conductors extending on a second surface parallel to said reference surface and at a distance $-d$ of said surface, the distance $-d$ being measured in said direction u, the second conductors extending in a direction of increasing t and decreasing v, comprising $N\_s$ subgroups of second conductors each having $N\_c$ second conductors, a distance being provided between each conductor of a subgroup, a larger distance being provided between each subgroup, said distances being measured in direction t, subgroups of the second group being numbered from 1 to $N\_s$ increasing in the direction t first conductors of the first group overlapping second conductors of the second group at interconnection zones, the interconnection zones comprising:
      upper interconnection zones where subgroup i of first group overlaps subgroup i+1 of second group, for all i between 1 to $N\_s-1$;
      lower interconnection zones where subgroup i of second group overlaps subgroup i+1 of first group, for all i between 1 to $N\_s-1$, an interconnection zone to connect a first conductor to a second conductor overlapping said first conductor;
      an additional upper interconnection zone where the last subgroup of conductors of the first group of first conductors overlaps the first subgroup of conductors of second group of second conductors; and
      an additional lower interconnection zone where the last subgroup of conductors of the second group of second conductors overlaps the first subgroup of conductors of the first group of first conductors,
   the number of first conductors and second conductors of the array, $N\_hl$, being equal to $2*N\_s*N\_c$.

12. Winding for an electrical machine, comprising an array of conductors according to claim 11, wherein $N\_t$ coils are formed by connections of a sequence of a number $N\_hl/N\_t$ of first and second conductors at upper and lower interconnection zones, each coil having a first and a second terminal, $N\_t$ being a divisor of $N\_hl$, comprising:
   if $N\_hl/N\_t$ is a multiple of $N\_s$, $N\_t$ coils,
   if $N\_hl/N\_t$ is not a multiple of $N\_s$, $N\_t/N$ pluralities of $N$ coils, $N$ being the smallest integer such that $N*N\_hl/N\_t$ is a multiple of $N\_s$, a first coil of a plurality of coils having a first terminal in a first interconnection zone, a last coil of said plurality having a second terminal in said first interconnection zone, second terminals of coils of said plurality of coils being in same interconnection zone as a first terminal of a coil of said plurality of coils.

13. Winding according to claim 11, wherein said reference surface is a plane, said curve is a circle, adapted for use in an electrical machine having an inductor structure comprising a sequence of $N\_s$ north and south magnetic poles along said curve, each magnetic pole producing a magnetic field generally in local direction u.

14. Winding according to claim 11, wherein said reference surface is a cylinder, said curve is a circle, adapted for use in an electrical machine having an inductor structure comprising a sequence of $N\_s$ north and south magnetic poles along said curve, each magnetic pole producing a magnetic field generally in local direction u.

15. Electrical machine comprising an array of conductors according to claim 11, wherein $N\_t$ coils are formed by connections of a sequence of a number of first and second conductors at interconnection zones, each coil having a first and a second terminal, comprising a plug-in interconnection module adapted to be connected to the first and second terminals of each of said $N\_t$ coils, and comprising interconnections for grouping said $N\_t$ coils in series or parallel connections and/or combinations of series and parallel connections, forming groupings of coils and terminals for accessing said groupings of coils.

16. Electrical machine according to claim 15, characterized in that said plug-in interconnection module comprises:
   one or more controllable switches; and
   a switches controller configured for controlling the controllable switches for grouping said $N\_t$ coils in series or parallel connections.

17. Array of conductors according to claim 11, further comprising a layer of insulating material between said first surface and said second surface.

18. Array of conductors according to claim 17, characterised in that said layer of insulating material is flexible.

* * * * *